US009183316B2

(12) United States Patent
Van Den Driessche

(10) Patent No.: US 9,183,316 B2
(45) Date of Patent: Nov. 10, 2015

(54) PROVIDING ACTION LINKS TO SHARE WEB CONTENT

(75) Inventor: George Van Den Driessche, London (GB)

(73) Assignee: Google Inc., Mountain View, CA (US)

( * ) Notice: Subject to any disclaimer, the term of this patent is extended or adjusted under 35 U.S.C. 154(b) by 1407 days.

(21) Appl. No.: 12/571,129

(22) Filed: Sep. 30, 2009

(65) Prior Publication Data

US 2011/0078232 A1 Mar. 31, 2011

(51) Int. Cl.
*G06F 15/16* (2006.01)
*G06F 17/30* (2006.01)
*G06F 17/22* (2006.01)
*G06Q 50/00* (2012.01)

(52) U.S. Cl.
CPC ........ *G06F 17/3089* (2013.01); *G06F 17/2235* (2013.01); *G06Q 50/01* (2013.01)

(58) Field of Classification Search
CPC ............................ G06Q 50/01; G06F 17/2235
USPC ................. 709/203, 223; 707/10, 102, 104.1; 713/178; 715/205
See application file for complete search history.

(56) References Cited

U.S. PATENT DOCUMENTS 6,546,393 B1 * 4/2003 Khan .................................... 1/1
2006/0173985 A1 8/2006 Moore
2008/0010319 A1 * 1/2008 Vonarburg et al. ......... 707/104.1
2008/0082904 A1 * 4/2008 Martinez et al. .............. 715/205
2008/0263135 A1 * 10/2008 Olliphant ...................... 709/203
2008/0294904 A1 * 11/2008 Amsterdam et al. .......... 713/178
2009/0043874 A1 * 2/2009 Kim et al. ...................... 709/223
2009/0106257 A1 * 4/2009 Iskold et al. .................... 707/10
2009/0125511 A1 * 5/2009 Kumar .............................. 707/5
2009/0138484 A1 * 5/2009 Ramos et al. .................... 707/10
2009/0234876 A1 * 9/2009 Schigel et al. ................ 707/102
2009/0271283 A1 * 10/2009 Fosnacht et al. ................ 705/26
2010/0241962 A1 * 9/2010 Peterson et al. .............. 715/720
2010/0281364 A1 * 11/2010 Sidman ......................... 715/713
2011/0093328 A1 * 4/2011 Woolcott ..................... 705/14.41
2011/0231265 A1 * 9/2011 Brown et al. .............. 705/14.73
2012/0323704 A1 * 12/2012 Steelberg et al. .......... 705/14.73

OTHER PUBLICATIONS

Felocity. "Just in Time Loader for JavaScript". Nov. 27, 2007. pp. 1-4.*
"AddThis—What is AddThis?", http://www.addthis.com/help/what-is-addthis, pp. 2-3, printed on Sep. 30, 2009.
"AddThis—The #1 Bookmarking & Sharing Service", http://www.addthis.com, p. 1, printed on Sep. 30, 2009.
"ShareThis >> Users—Archive for the "Users" Category", http://support.sharethis.com/support/users, pp. 1-5, printed on Sep. 30, 2009.

(Continued)

*Primary Examiner* — Imad Hussain
(74) *Attorney, Agent, or Firm* — Harrity & Harrity, LLP

(57) ABSTRACT

Action links for a web document may be dynamically generated by a third party. In one implementation, a method may include receiving a request from a client device relating to a document being processed by the client device, the request including a request for content in which the content defines action links that are to be inserted into the document. Action links may be determined for the document based on preferences of a user and content may be generated that describes the determined action links.

23 Claims, 11 Drawing Sheets

(56) References Cited

OTHER PUBLICATIONS

"ShareThis >> Publishers—Archive for the "Publishers" Category", http://support.sharethis.com/support/publishers, pp. 1-5, printed on Sep. 30, 2009.
Taro Yabuki et al., "Development of Collaboration Environments on Web 1.0", College of Science and Engineering, Aoyama Gakuin University, Japan, The fifth International Conference on IEEE, Jan. 1, 2007, pp. 25-30, XP031070541.
Notification of Transmittal of the International Search Report and the Written Opinion of the International Searching Authority, or the Declaration corresponding to PCT/US2010/050785, mailed Dec. 28, 2010, 13 pages.

* cited by examiner

910

USER: GEO123

| ACTION TYPE | ACTION |
|---|---|
| EMAIL | gmail |
| SOCIAL BOOKMARKING | myBookmarkSite |
| COMMUNITY | mySocialSite |

USER: GEO123

PREFERRED SERVICES: gmail, myBookmarkSite, mySocialSite

Fig. 9B

PROVIDING ACTION LINKS TO SHARE WEB CONTENT

BACKGROUND

Many techniques are available to users today to find information on the world wide web ("web"). For example, users often use web browsers and/or search engines to find information of interest.

Web content providers, such as news sites, blog hosts, or event listing sites, in addition to providing content items, may include "action links" with the content items. An action link may be thought of as an invitation to act on, such as by sharing, the content item. Typically, the action link for a content item is shown visually near the content item. The action link could be an invitation to, for example, submit the content item to a news aggregator, e-mail the content item to an e-mail destination, add an entry to the user's online calendar, or write a review about the content item.

Action links are typically used to drive content to a host site (i.e., the site providing the content items) by making it easy for readers to disseminate links to the hosted content items. A blog hosting site may, for example, provide action links next to blog posts. When a user selects the action link, the user may be taken to a service referenced by the action link, which may allow the user to submit the content item to the service. Unfortunately, the action links provided by a particular hosting site may refer to services in which the user is not interested.

SUMMARY

According to one implementation, a method, performed by a server device, may include receiving, at a processor associated with the one or more server devices, a request from a client device relating to a document being processed by the client device, the request including a request for content in which the content defines action links that are to be inserted into the document. The method may further include identifying, by a processor associated with the one or more server devices, one or more action links based on preferences of a user associated with the client device, each of the one or more action links providing an opportunity for the user associated with the client device to act on the document. The method may still further include generating, by a processor associated with the one or more server devices, content that describes the one or more action links; and providing, by a processor associated with the one or more server devices to the client device, the content for presentation within the document being processed by the client device.

According to another implementation, a computer-readable medium containing instructions executable by one or more devices may include one or more instructions to receive a request from a client for action links that are to be displayed within a document presented by the client, the request including one or more parameters that define at least one of a type of content of the document, a content provider associated with the document, or default action link categories corresponding to the document. The computer-readable medium may further include one or more instructions to determine the action links that are to be provided to the client based at least on preferences of a user associated with the client or preferences of the content provider and one or more instructions to generate content that describes the determined action links. The computer-readable medium may further include one or more instructions to provide the generated content to the client device for presentation of the document with the content that describes the determined action links.

According to yet another implementation, a system may include a front end component to receive a request from a client device relating to a document to which the client device has requested access, the request including a request for content in which the content describes action links that are to be inserted into the document. The system may further include a preferences storage component to transmit, in response to a request from the front end component, preference information relating to a user of the client device to the front end component, the front end component determining, based on the preference information, one or more action links for the document, each of the one or more action links providing an opportunity for the user associated with the client to act on the document. The system may still further include an action registry component to transmit, in response to a request from the front end component that includes the determined action links, content that represents the one or more action links; where the front end component provides the content from the action registry to the client device for presentation within the document.

According to yet another implementation, a device may include means for receiving a request from a client device relating to a content item being presented by the client device, the request including a request for content in which the content describes action links that are to be displayed is association with the content item. The device may further include means for determining, based at least on preferences of a user associated with the client device, one or more action links, each of the one or more action links providing an opportunity for the user associated with the client device to act on the content item. Still further, the device may include means for generating the content that describes the one or more determined action links; means for providing, to the client device, the content to the client device for presentation of the content item with the content; and means for contacting a service associated with a particular action link described by the content in response to selection of the particular action link by the user.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 9A illustrates an exemplary data structure that stores service preferences by category (action type);

FIG. 9B illustrates a second exemplary data structure that stores preferences for a user.

DETAILED DESCRIPTION

The following detailed description refers to the accompanying drawings. The same reference numbers in different drawings may identify the same or similar elements.

Overview

A content host may provide action links relating to a content item presented in the vicinity of the action links. Instead of providing a predefined set of action links, the action links may be generated for the user based on preferences that apply to the user. Accordingly, the action links presented to the user may be more likely to be action links in which the user is interested.

In one described exemplary implementation, the action links may be dynamically generated by a third party. In this implementation, the original content item may include a link, such as a link within an inline frame (iframe) which causes the user's browser to access the third party site to obtain the action links.

A "document," as the term is used herein, is to be broadly interpreted to include any machine-readable and machine-storable work product. A document may include, for example, an e-mail, a web site, a file, a combination of files, one or more files with embedded links to other files, a news group posting, a news article, a blog, a business listing, an electronic version of printed text, a web advertisement, etc. In the context of the Internet, a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document. An "action link," as the term is used herein, is to be broadly interpreted to include any reference within a document that invites or otherwise enables the reader of the main content ("content item") of the document to easily act on the content item, such as to easily disseminate the content item to another site, such as a social news aggregation site, an online calendar, etc.

Figure 1:
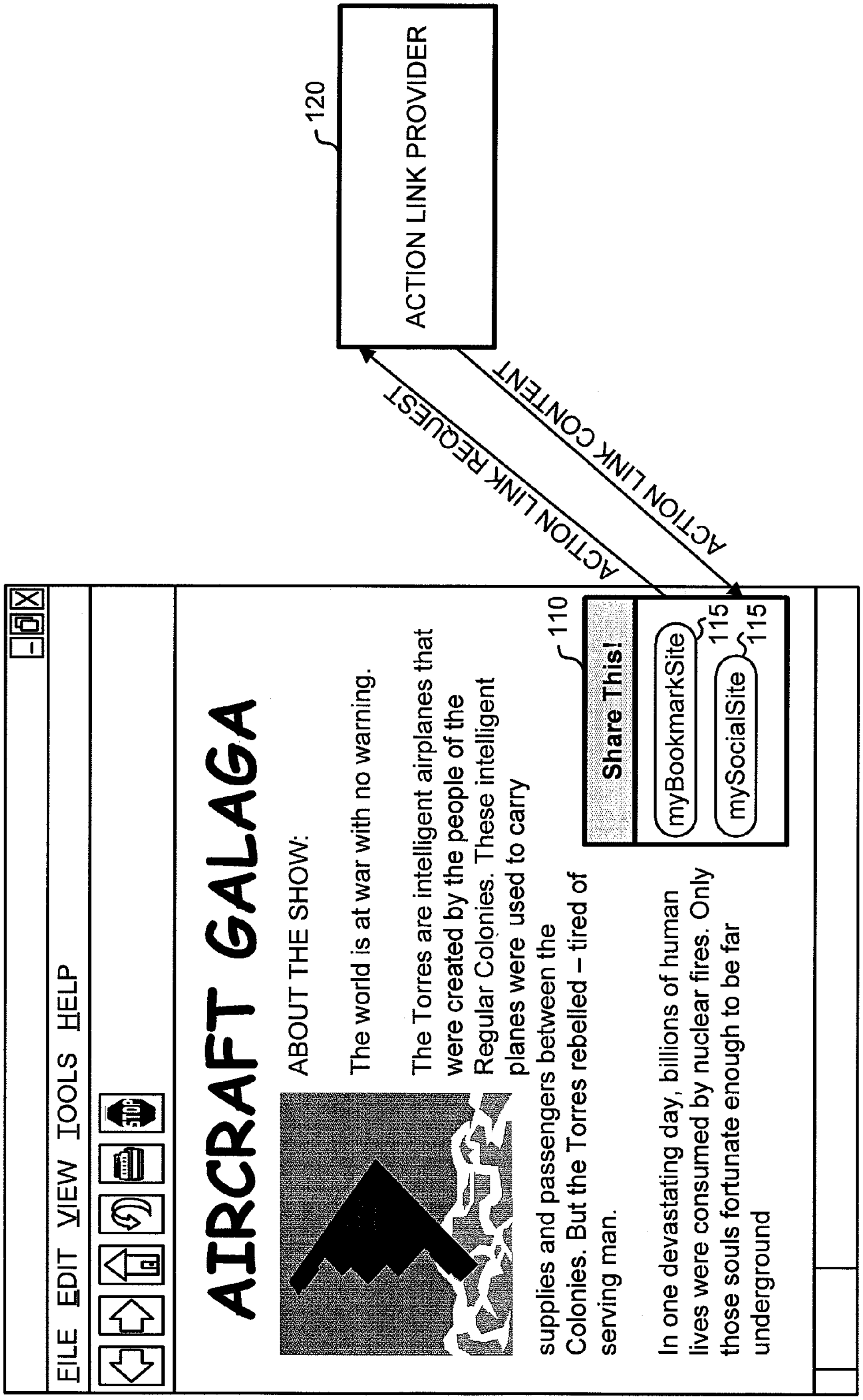
FIG. 1 is a diagram illustrating an overview of an exemplary implementation described herein.

FIG. 1 is a diagram illustrating an overview of an exemplary implementation described herein. As shown in FIG. 1, assume that a user accesses, via a web browser, a document about a television show entitled "Aircraft Galaga." The document may include the primary content of the document (i.e., the content item)—in this case information relating to the show "Aircraft Galaga," as well as action links 110. Action links 110 may include selectable items, such as buttons 115, that provide an easy link through which the user may submit the content item to another site. In this example, buttons are shown for submitting the content items to the fictional web sites "myBookmarkSite" and "mySocialSite." These web sites may represent services for the action links. When a user selects one of buttons 115, the article about the show "Aircraft Galaga" may be "submitted" to the corresponding site or the user may be taken to a web page through which the user may submit the article. Depending on the site, "submitting" may refer to, for example, in the case of "mySocialSite," providing a link to the article to as well as user commentary relating to the article. In the case of "myBookmarkSite," submitting the article may correspond to adding a link to the article to a list of user bookmarks stored by the site.

Consistent with concepts described herein, action links 110 may be embedded in the document as, for example, a frame that includes a link to a service, implemented by action link provider 120. Action link provider 120 may dynamically provide the content corresponding to action links 110 based on user preference information that was previously stored with the action link provider 120. As shown in FIG. 1, the web browser, when rendering the document, may request the content corresponding to action links 110 from action link provider 120. Action link provider 120 may return the content, which may be customized for the user and displayed in the browser.

Exemplary Environment

Figure 2:
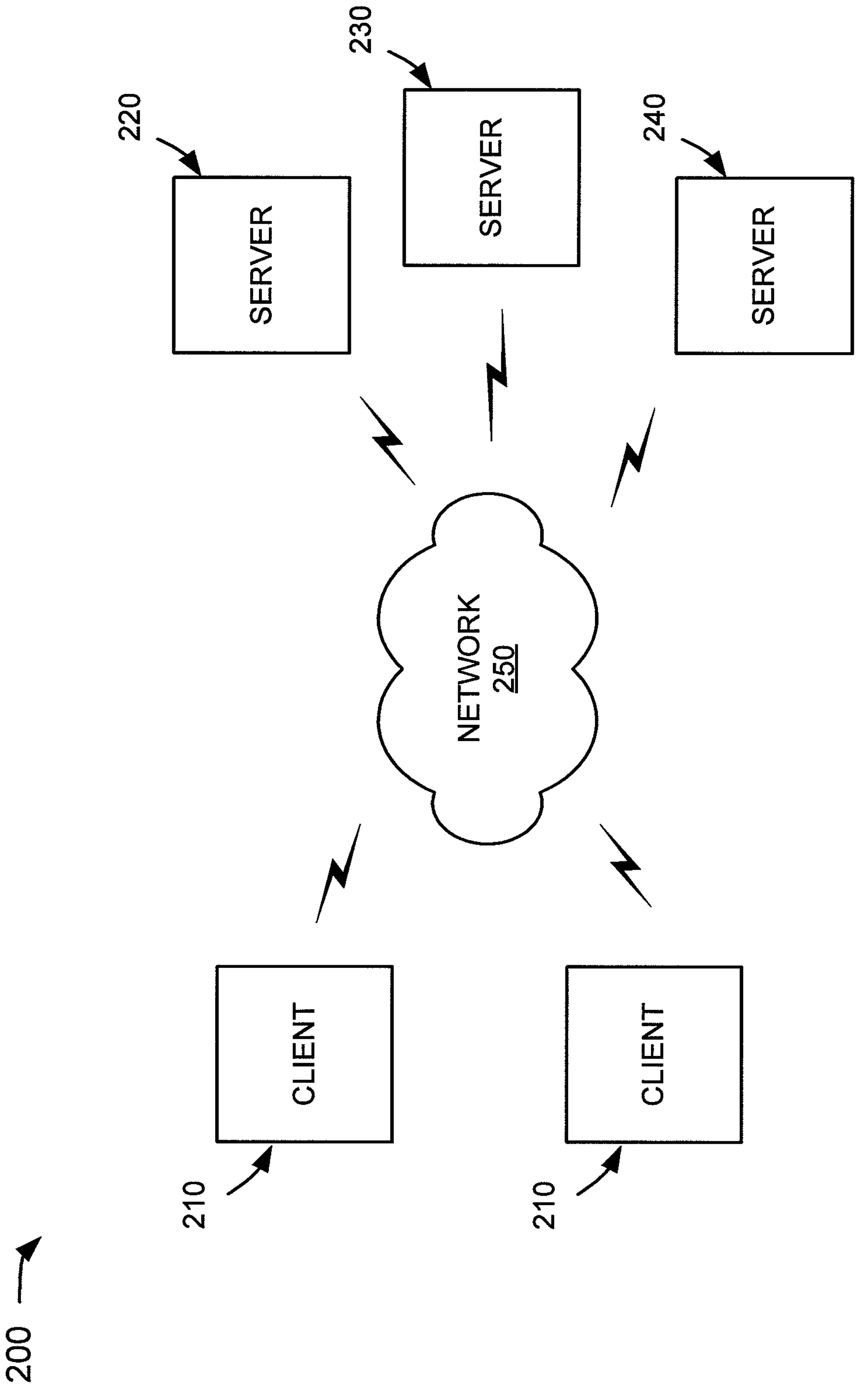
FIG. 2 is a diagram of an exemplary environment in which systems and methods described herein may be implemented.

FIG. 2 is a diagram of an exemplary environment 200 in which systems and methods described herein may be implemented. Environment 200 may include multiple clients 210 connected to multiple servers 220-240 via a network 250. Two clients 210 and three servers 220-240 have been illustrated as connected to network 250 for simplicity. In practice, there may be more or fewer clients and servers. Also, in some instances, a client may perform a function of a server and a server may perform a function of a client.

Clients 210 may include client entities. An entity may be defined as a device, such as a personal computer, a wireless telephone, a personal digital assistant (PDA), a lap top, or another type of computation or communication device, a thread or process running on one of these devices, and/or an object executed by one of these devices. In one implementation, a client 210 may include a browser that permits documents to be searched and/or accessed. Client 210 may include additional software, such as a plug-in, an applet, a dynamic link library (DLL), or another executable object or process, that may operate in conjunction with (or be integrated into) the browser to obtain and display documents. Client 210 may obtain the software from server 220 or from a third party, such as a third party server, disk, tape, network, CD-ROM, etc.

Servers 220-240 may include server entities that gather, process, search, and/or maintain documents in a manner described herein. In one implementation, server 220 may, function as action link provider 120, store user preference information relating to the types of action links preferred by a user and generate action links. Servers 230 and 240 may represent content providers that may use the services of server 220 when serving documents to clients 210.

While servers 220-240 are shown as separate entities, it may be possible for one or more of servers 220-240 to perform one or more of the functions of another one or more of servers 220-240. For example, it may be possible that two or more of servers 220-240 are implemented as a single server. It may also be possible for a single one of servers 220-240 to be implemented as two or more separate (and possibly distributed) devices.

Network 250 may include any type of network, such as a local area network (LAN), a wide area network (WAN), a telephone network (e.g., the Public Switched Telephone Network (PSTN) or a cellular network), an intranet, the Internet, or a combination of networks. Clients 210 and servers 220-240 may connect to network 250 via wired and/or wireless connections.

Exemplary Client/Server Architecture

Figure 3:
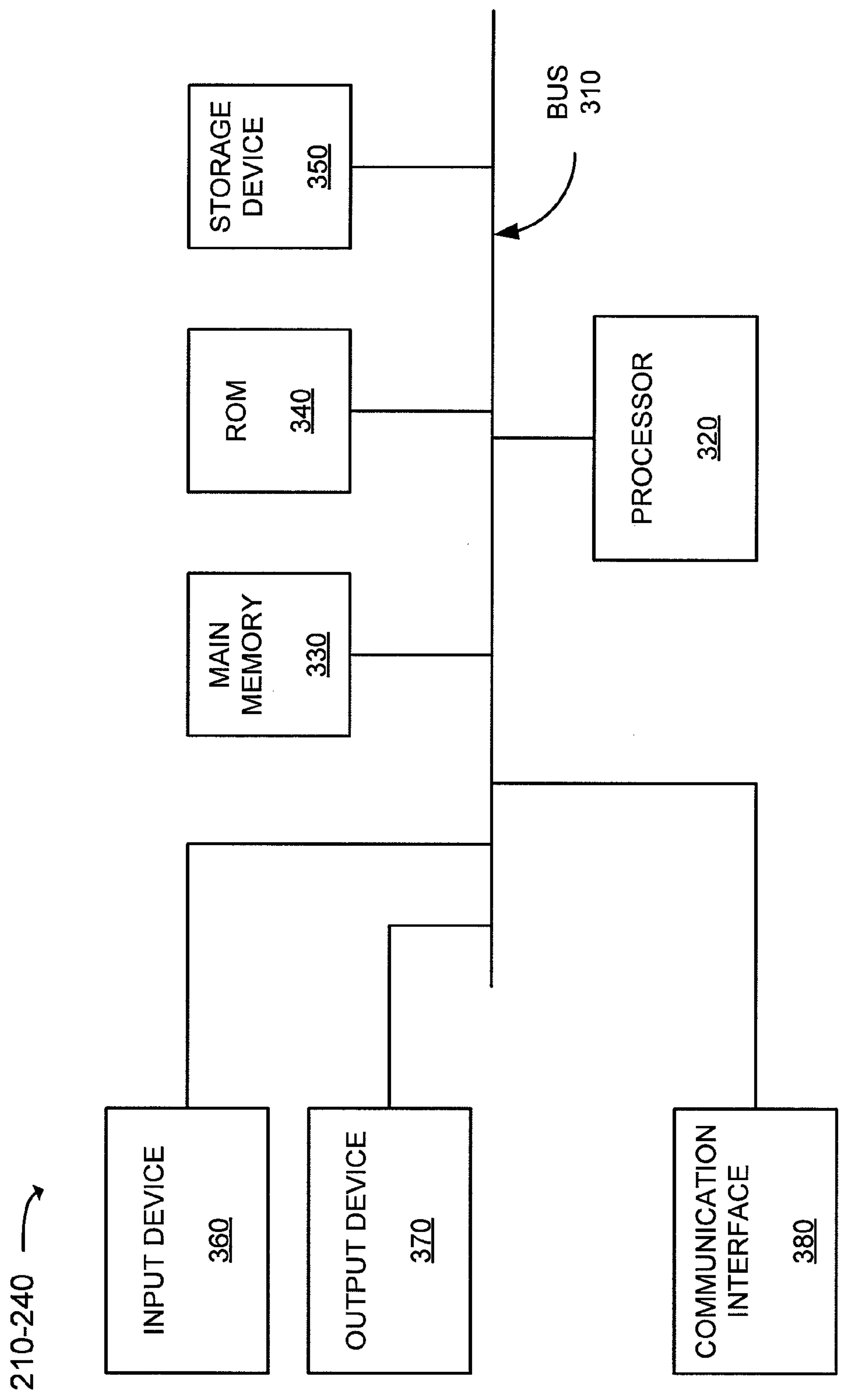
FIG. 3 is a diagram of exemplary components of a client or server of FIG. 2.

FIG. 3 is a diagram of exemplary components of a client or server entity (hereinafter called "client/server entity"), which may correspond to one or more of clients 210 and/or servers 220-240. The client/server entity may include a bus 310, a processor 320, a main memory 330, a read only memory (ROM) 340, a storage device 350, an input device 360, an output device 370, and a communication interface 380. In another implementation, client/server entity may include additional, fewer, different, or differently arranged components than are illustrated in FIG. 3.

Bus 310 may include a path that permits communication among the components of the client/server entity. Processor 320 may include a processor, a microprocessor, or processing logic (e.g., an application specific integrated circuit (ASIC) or a field programmable gate array (FPGA)) that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive, or a removable form of memory, such as a flash memory.

Input device 360 may include a mechanism that permits an operator to input information to the client/server entity, such as a keyboard, a mouse, a button, a pen, a touch screen, voice recognition and/or biometric mechanisms, etc. Output device 370 may include a mechanism that outputs information to the operator, including a display, a light emitting diode (LED), a speaker, etc. Communication interface 380 may include any transceiver-like mechanism that enables the client/server entity to communicate with other devices and/or systems. For example, communication interface 380 may include mechanisms for communicating with another device or system via a network, such as network 250.

As will be described in detail below, the client/server entity may perform certain document processing-related operations. The client/server entity may perform these operations in response to processor 320 executing software instructions contained in a computer-readable medium, such as memory 330. A computer-readable medium may be defined as one or more logical or physical memory devices. A logical memory device may include a space within a single physical memory device or spread across multiple physical memory devices.

The software instructions may be read into memory 330 from another computer-readable medium, such as storage device 350, or from another device via communication interface 380. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Providing of Dynamic Action Links

Figure 4:
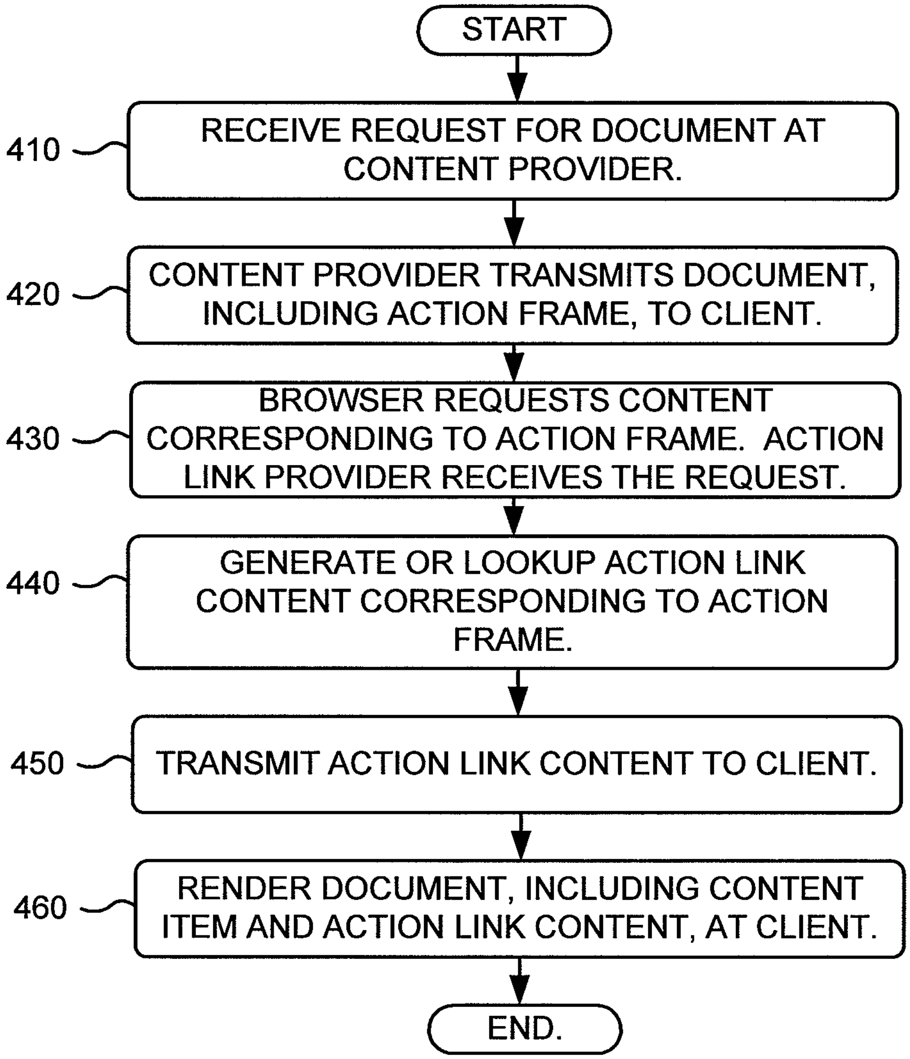
FIG. 4 is a flowchart of exemplary operations for providing a document containing action links to a user.

FIG. 4 is a flowchart of exemplary operations for providing a document, containing action links, to a user. In one implementation, the process of FIG. 4 may be performed by one or more components within servers 220-240 and/or client 210. In another implementation, the process may be performed by one or more components within another device or a group of devices separate from or including servers 220-240 and/or client 210.

Figure 5:
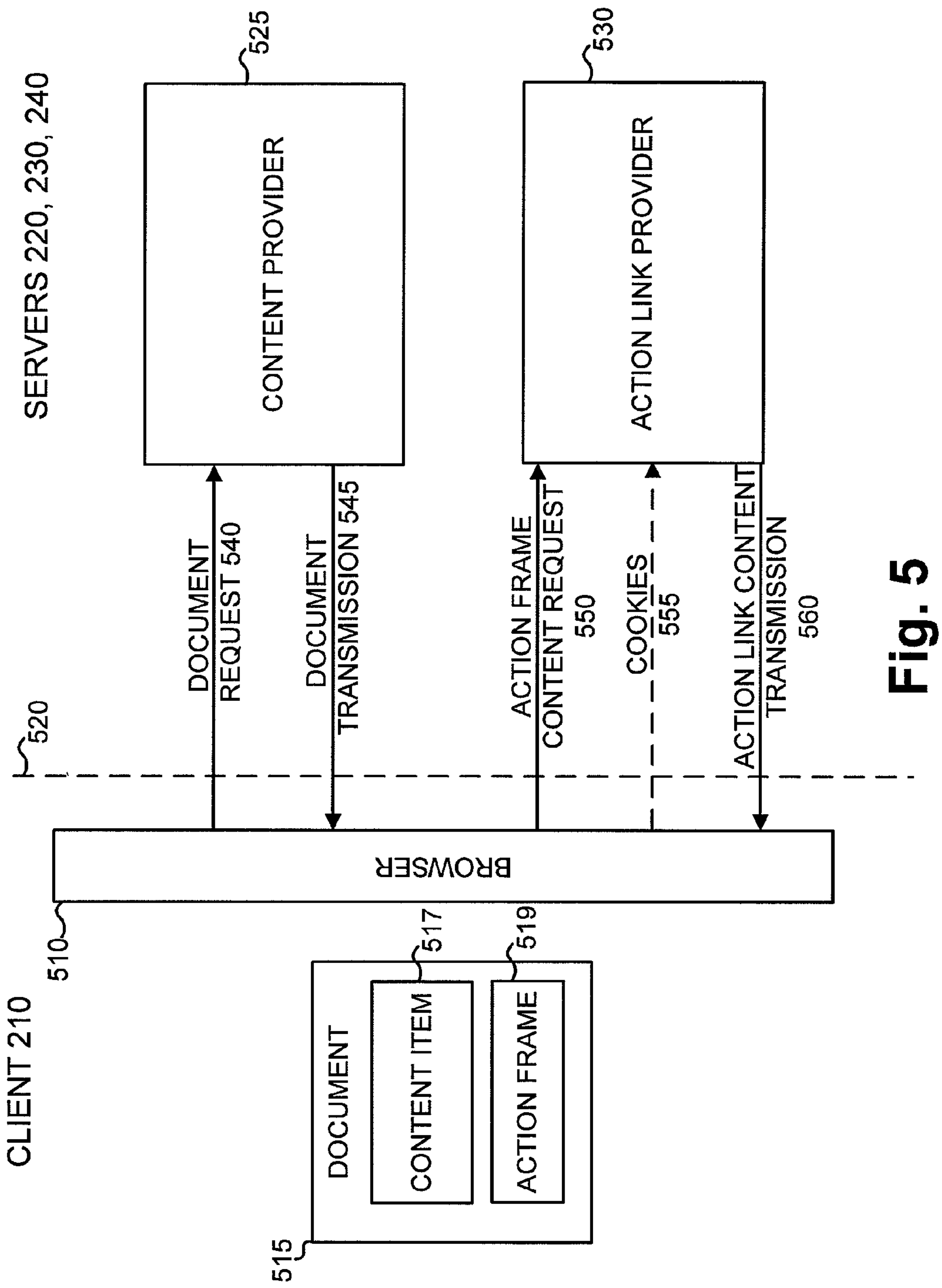
FIG. 5 is a block diagram conceptually illustrating the operations shown in FIG. 4.

FIG. 5 is a block diagram conceptually illustrating the operations shown in FIG. 4. The flow chart of FIG. 4 will be discussed in conjunction with FIG. 5. As shown in FIG. 5, client 210 may include a browser 510. Browser 510 may render document 515 for display to a user. Dashed line 520 may represent network 250, which may connect client 210 to servers 220, 230, and/or 240. Servers 220, 230, and/or 240 may include web servers such as content provider 525 and action link provider 530.

The operations of FIG. 4 may begin with a request from a client for a document from content provider 525 (FIG. 4, block 410; FIG. 5, request 540). Content provider 525 may include, for example, any web site or content host that delivers documents to clients, such as a blog hosting site, a news site, or any other type of site that provides content to users. The document request may be generated by browser 510 in response to a user request for the document (e.g., the user may select a link for the document within browser 510 or enter an address of the document into an address box provided by browser 510).

In response to the request, content provider 525 may transmit the requested document 515 to browser 510 (FIG. 4, block 420; FIG. 5, document transmission 545). Document 515 may at least include content item 517 and action frame 519. Content item 517 may include, for example, a hyper-text markup language (HTML) document that includes the content (e.g., a blog posting, another type of textual article, a graphical or video based document, or a combination of text/graphic/video document). Action frame 519 may include a link to action link provider 530. The link may act as a request for action link provider 530 to return content, that when rendered by browser 510, displays action links to the user.

In one implementation, action frame 519 may be provided by content provider 525 and include an HTML inline frame (iframe) element. In general, an iframe element can be used to place a second HTML document inside a frame that is contained within the main HTML document. Action frame 519 may include a uniform resource locator (URL) that includes a link to action link provider 530 as well as parameters that may be used by action link provider 530 when generating the content for action frame 519. In an alternative possible implementation, action frame 519 may include a script or other structure that may contact action link provider 530 and provide parameters that action link provider 530 may use to generate content.

Figure 6:
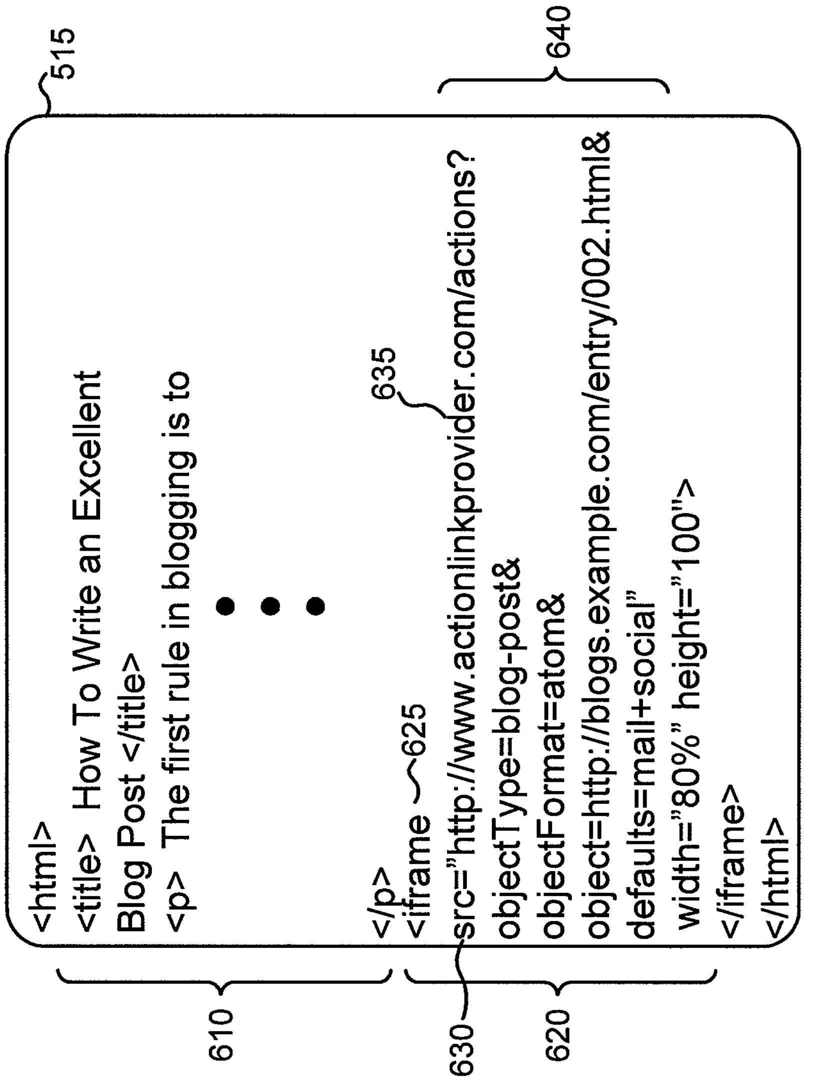
FIG. 6 is a diagram illustrating portions of an exemplary document that may be provided by the content provider shown in FIG. 5.

FIG. 6 is a diagram illustrating portions of an exemplary document 515, as provided by content provider 525. In this example, document 515 is an HTML document. As shown, document 515 includes content item section 610, which may correspond to the content item (e.g., content item 517 in FIG. 5) that is displayed for document 515. Document 515 may also include action frame section 620, which may correspond to the action frame (e.g., action frame 519 in FIG. 5) for document 515. Action frame section 620 may include an iframe tag 625 that indicates an inline frame should be inserted into document 515. Tag 625 may include a number of attributes, including attribute "src" 630 that specifies the uniform resource locator (URL) 635 that browser 510 will request to obtain the content for action frame 519 and parameters 640 relating to the content of action frame 519. It can be appreciated that the formatting shown in FIG. 6 is edited for clarity. In an actual implementation, parameters 640 may be concatenated as a single string.

Parameters 640 may include a number of parameters that action link provider 530 may use in generating the content for action frame 519. Specific examples of parameters, such as those shown in FIG. 6, will be discussed in more detail below.

Although an iframe is used in FIG. 6 to contain the link to action link provider 530, in alternative implementations, other frame types or markup elements may instead be used.

For instance, an HTML "<table>" element (or other element) may be used to contain the link to action link provider 530.

Referring back to FIGS. 4 and 5, browser 510 may next request the content corresponding to action frame 519, which request may be received by action link provider 530 (FIG. 4, block 430; FIG. 5, request 550). In the example shown in FIG. 6, the domain "actionlinkprovider.com" corresponds to action link provider 530. In some implementations, action link provider 530 may be configured to use cookies to assist in identifying the user. Cookies are a known technique for session tracking and maintaining state information about users. Typically, a browser enabled for cookies may accept text from a web site when the browser requests content from the web site. The browser may then send the text back to the web site when the browser requests additional content from the web site. Cookies may be used by action link provider 530 to identify users so that customized action frame content may be provided. In alternative implementations, techniques other than cookies may be used to identify users. In implementations in which cookies are used, cookies 555 may also be sent to action link provider 530.

Action link provider 530 may respond to the request 550 from browser 510. In particular, action link provider 530 may lookup or generate action link content, such as HTML content, for action frame 519 (FIG. 4, block 440). In addition to traditional HTML, the action link content can include other forms of content, such as content expressed using other markup languages, scripts executed by browser 510 (e.g., Javascript), or a combination of scripts and HTML. The action link content may be customized for the user of browser 510 and may additionally be based on parameters 640 or based on other logic implemented by action link provider 530. The generation of the content for action frame 519 will be discussed in more detail below.

As mentioned, in one possible implementation, the action link content may be generated by action link provider 530 as a script. The script may be a script that when executed by client 210, may display action link content that was encoded in the script or included as parameters for the script, by action link provider 530. Alternatively, the script may, when executed by client 210, determine or lookup action link content. For example, the script may dynamically determine additional action links to present to the user when the script is executed at client 210. For instance, the script may contact action link provider 530, or another server, in determining the additional action links. Alternatively, the script may determine additional action links (or select from a set of action links provided by action link provider 530) based on feedback from the user.

Action link provider 530 may transmit the generated action link content to browser 510 (FIG. 4, block 450; FIG. 5, action link content transmission 560). Browser 510 may then render document 515, including the content item received from content provider 520 and the action link content received from action link provider 530. From the user's perspective, the rendered document may appear to be the result of a single document request and may contain action links that are relevant to the user.

The generation of content for action frame 519 by action link provider 530 (FIG. 4, block 440) will now be discussed in additional detail with reference to FIGS. 7-9.

Figure 7:
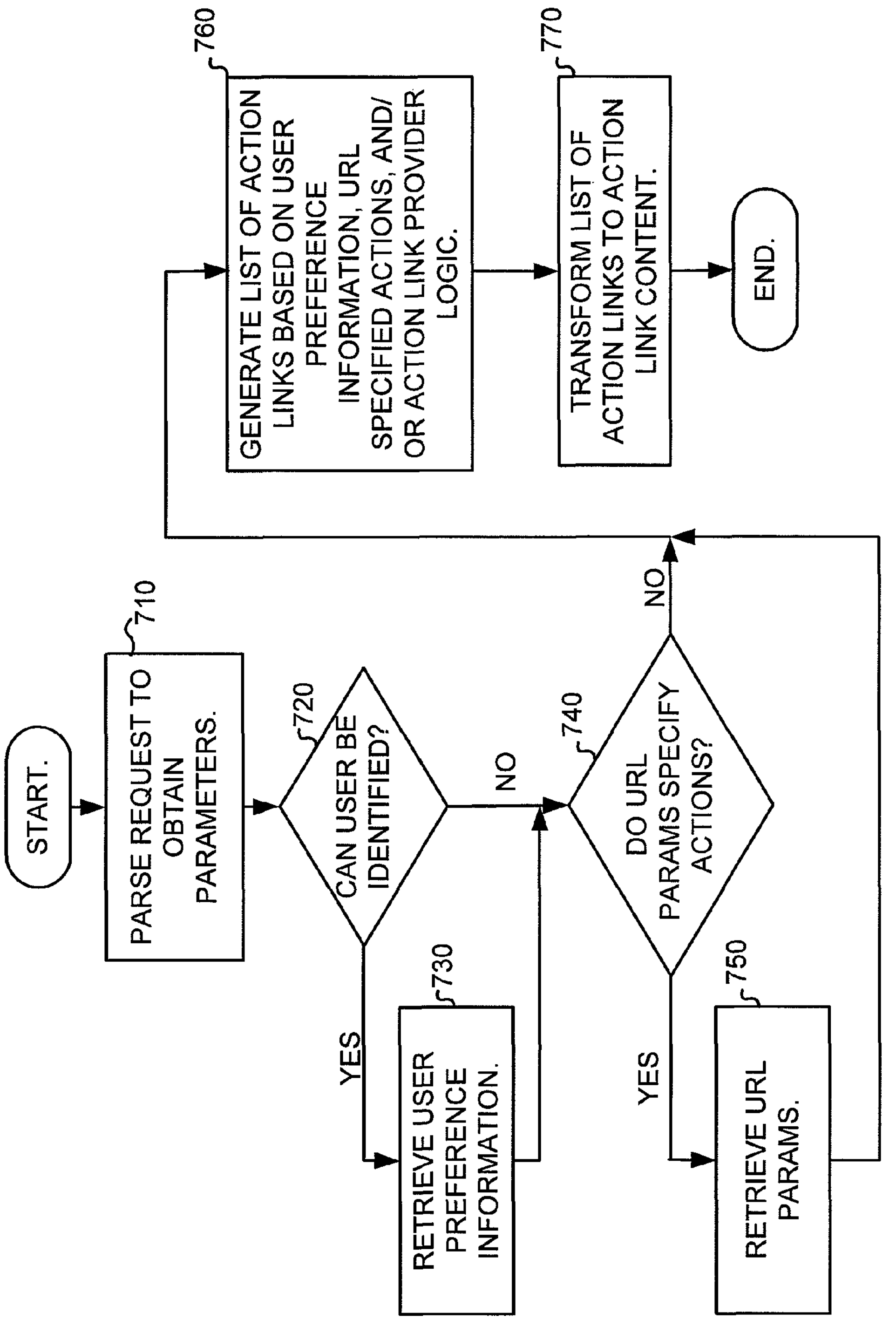
FIG. 7 is a flowchart of exemplary operations for generating content for an action frame.
Figure 8:
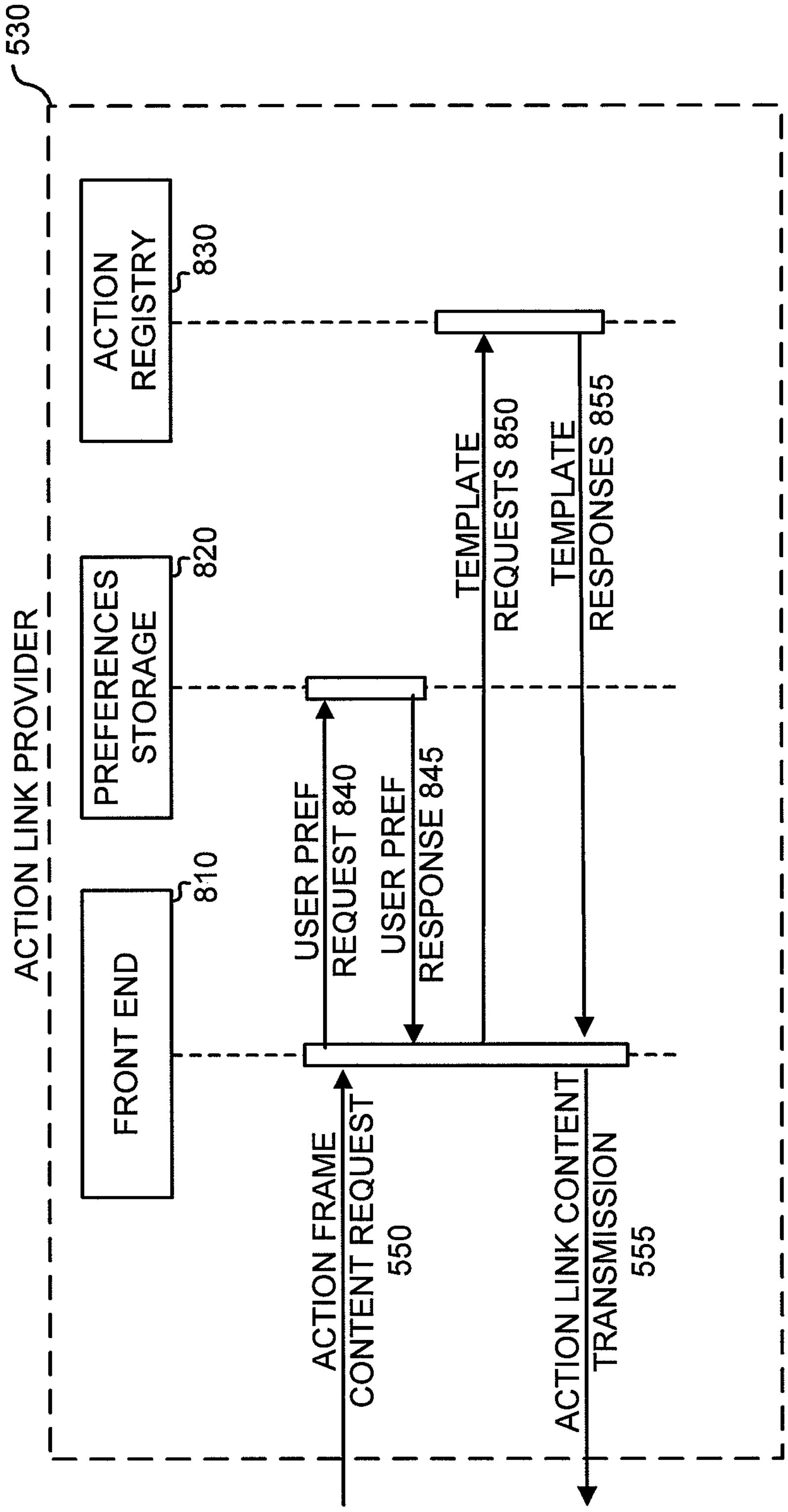
FIG. 8 is a block diagram conceptually illustrating the operations shown in FIG. 7.

FIG. 7 is a flowchart of exemplary operations for generating content, by action link provider 530, for action frame 519. FIG. 8 is a block diagram conceptually illustrating the operations shown in FIG. 7. The flow chart of FIG. 7 will be discussed in conjunction with FIG. 8. As shown in FIG. 8, action link provider 530 may be conceptualized as including a front end component 810, preferences storage component 820, and action registry component 830. In some implementations, action link provider 530 may be implemented as a distributed collection of servers, in which each of front end component 810, preferences storage component 820, and action registry component 830 are implemented as one or more servers 220-240. In other possible implementations, the functions of one or more of front end component 810, preferences storage component 820, and action registry component 830 may be combined on a single server or servers. In general, front end component 810 may function to receive action frame content requests, communicate with preferences storage component 820 and action registry component 830 to fulfill the request (i.e., generate the action frame content), and transmit the action frame content to client 210.

Action link provider 530 may parse the action frame content request 550 to obtain values for the parameters contained in the request (block 710). The parameter values may be passed as a query string in action frame section 620 that begins after the "?" character. In the example of FIG. 6, for instance, each parameter is specified using the format "label=value," where label identifies the parameter and value defines the value of the parameter. The parameter "objectType" has the value "blog-post," the parameter "objectFormat" has the value "atom," the parameter "object" has the value "http://blogs.example.com/entry/002.html", and the parameter "defaults" has the values "mail" and "social". "ObjectType" may refer to the type of the content item, such as a "blog-post" for a blog post, "news" for a news article, etc. "ObjectFormat" may refer to the format of the content item. For example, the format "atom" may refer to the known Atom standard for web feed syndication. The "object" parameter may be a reference to content provider 525 or to the content item itself. In the example of FIG. 6, the "object" value may be the URL for document 515. The "defaults" parameter may refer to default action link categories that the content provider believes is most relevant to the content item. In this example, the categories include "mail" and "social," potentially indicating that action links for an e-mail service and a social bookmarking or aggregation service are relevant to the content item.

It can be appreciated that the parameters discussed above and shown in FIG. 6 are exemplary. Other parameters, or fewer parameters, could optionally be included. For example, content provider 530 may include a parameter that can be used to specify that certain action links should always be included in the action link content.

Action link provider 530 may be able to identify the user (block 720). For instance, cookies may be received with the action frame content request 550 that may identify the user. Other methods of identifying the user may alternatively be used. For example, action link provider 530 may require that a user have recently logged-in to a web site associated with action link provider 530 in order for the user to be considered logged-in. In some implementations, the action link content may allow the user to provide identification information. For instance, the action link content may include a script through which the user may provide identification information (e.g., a user name and password).

If the user is identified, (block 720—YES), front end component 810 may retrieve user action link preference information (block 730). The preference information may be retrieved via a user preference (pref) request 840 (FIG. 8) from front end component 810 to preferences storage component 820. Preferences storage component 820 may respond by transmitting user preferences (pref) response 845 back to front end component 810.

The user preference information can be stored at preferences storage component 820 in a variety of formats. FIGS. 9A and 9B are diagrams illustrating exemplary data structures through which preferences storage component 820 may store user preference information. The data structures may generally be stored in a computer readable medium, such as main memory 330 of a server 210-240 that implements preferences storage 820.

FIG. 9A illustrates an exemplary data structure 910 that stores service preferences by category (action type). In this example, action link services for e-mail, a social bookmarking site, and a social community site may be set by the user. The user "geo123," has selected the corresponding action services "gmail," "myBookmarkSite," and "mySocialSite." Assume that "gmail" corresponds to a web-based e-mail service, "myBookmarkSite" corresponds to a social bookmarking web service, and "mySocialSite" corresponds to a social networking web site. These services may have been previously selected by the user, such as when initially registering with action link provider 530 or sometime thereafter. Alternatively, some or all of these services may have been provided as default services by action link provider 530.

FIG. 9B illustrates a second exemplary data structure 920 that stores preferences for a user. In this example, instead of storing service preferences by category, data structure 920 may allow the user to simply store a list of services that the user would like to include in the delivered action links.

In some implementations, the user preference information may allow a user to define multiple different action links that are all handled by a single entity. For example, there may be many "gmail" actions, but each may be slightly different depending on the content type.

Referring back to FIG. 7, front end component 810 may determine whether the parameters received in the URL of the action frame content request 550 include information relating to which action links to select (block 740). In the example of FIG. 6, for instance, content provider 525 has indicated that action links related to e-mail ("mail") and a social bookmarking site ("social") should be included in the returned action links. As previously mentioned, in some implementations, in addition to including parameters for default or preferred action links, content provider 525 may be able to insert a parameter that specifies that certain action links must be shown to the user. For instance, content provider 525 may desire that action links to a particular service, such as action links to "mySocialSite," be presented with all content items served by content provider 525.

Front end component 810 may retrieve the URL parameters that specify actions (block 740—YES, block 750). Front end component 810 may generate a list of action links based on the retrieved user preference information, the retrieved URL parameters, and potentially based on logic implemented by front end component 810 (block 760). The list of action links may specify each of the services for which there is to be an active link in the action link content provided to browser 510. The logic implemented by front end component 810 may include, for example, default action links to provide (e.g., when none are specified by user preference information or URL parameters). In some implementations, the logic implemented by front end component 810 may include more sophisticated techniques for determining the most relevant action links for a particular request. For example, front end component 810 may use the URL of the content provider, the type of the content item (e.g., as provided by the "Object-Type" parameter), and individual or aggregate user specific history (e.g., previous actions relating to the user or a number or users) to determine which action links are likely to be useful or relevant to the user.

Front end component 810 may transform the list of action links to action link content (block 770). In one implementation, front end component 810 may use a store of registered actions to transform the list of action links into a corresponding HTTP response. Each action label (e.g., "gmail," "myBookmarkSite," or "mySocialSite") may correspond to a content template that includes a number of fields, such as: (1) a link to a graphic icon used to represent the action; (2) a localized text expression used to represent the action; and/or (3) an expression that can be used to transform the content URL into a URL that invokes the service corresponding to the action link. Front end component 810 may look up the templates for each action link from action registry component 830 via template requests 850 (FIG. 8). Action registry component 830 may return the content templates appropriate for each action link via template responses 855. In alternative implementations, the functions of action registry component 830 may be merged with the functions of front end component 810.

Front end component 810 may use the templates to generate the action link content. As an example of this, assume the label "gmail" was looked up in action registry component 830. The corresponding template may include (1) a reference to a graphical icon for the GMAIL service, such as: "http://gmail.com/img/little-gmail.gif". The template may also include (2) a text expression that is to be associated with the action link, such as "Submit to gmail." The template may also include (3) the expression needed to contact gmail.com to initiate the action, such as: "http://gmail.com/submit?phase=2&url={{content url}}," where front end component 810 may substitute the link to document 515 (e.g., "http://blogs.example.com/entry/002.html") for {{content_url}}. In this manner, front end 810 may use the template for each active link service to generate the complete action link content document that may be sent to client 210.

Figure 10A:
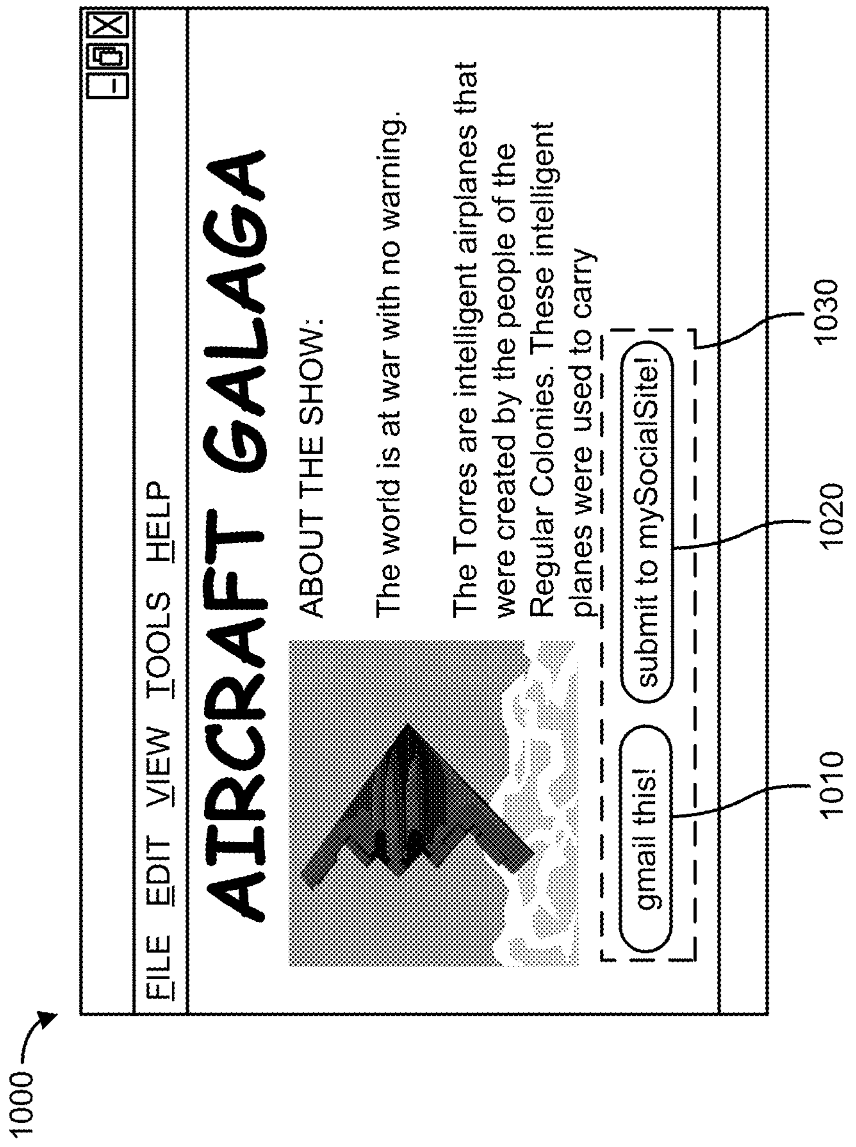
FIGS. 10A and 10B are diagrams of graphical user interfaces illustrating exemplary action links rendered by a browser for action link content returned from an action link provider.
Figure 10B:
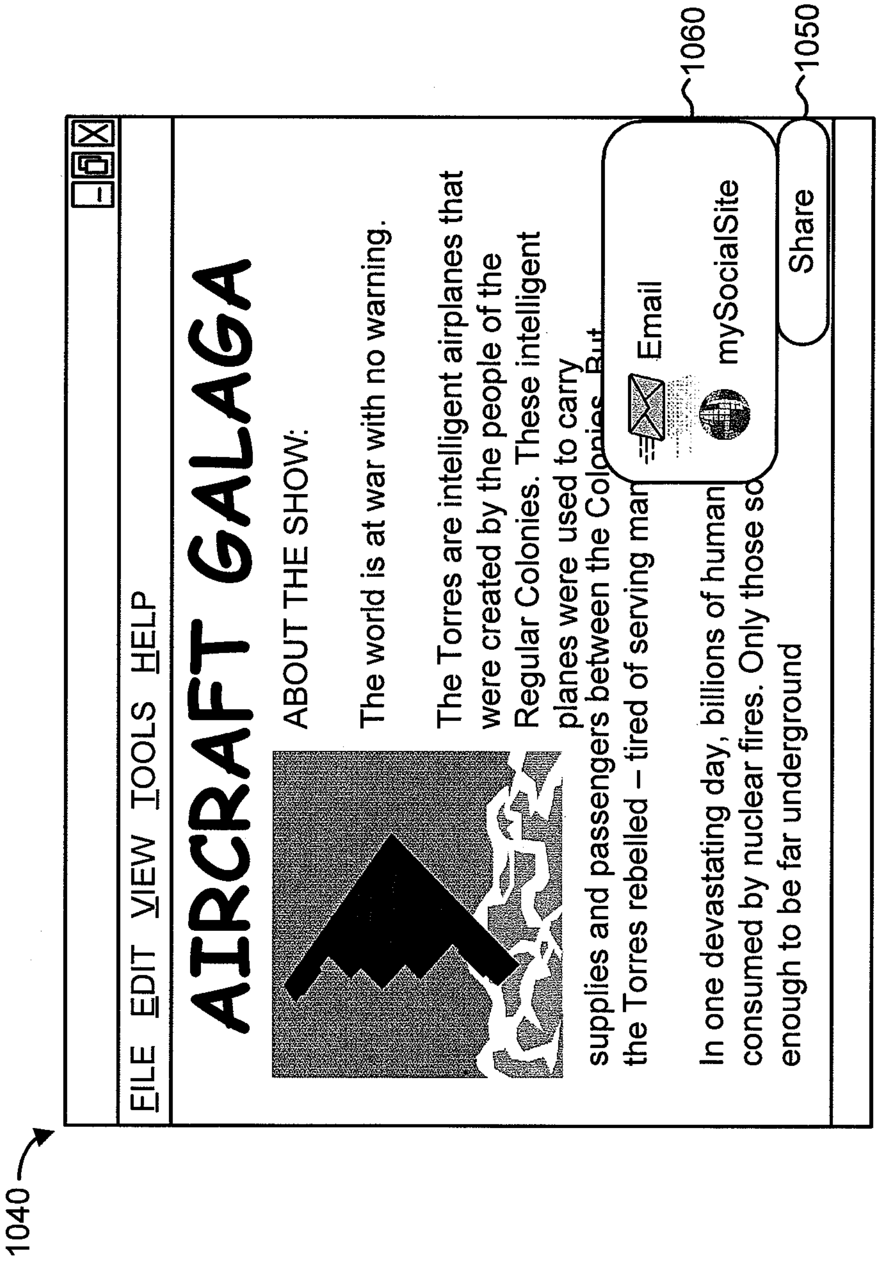

FIGS. 10A and 10B are diagrams of graphical user interfaces illustrating exemplary action links rendered by browser 510 for action link content returned from action link provider 530. As shown in FIG. 10A, two action links, rendered as buttons 1010 ("gmail this!") and 1020 ("submit to mySocialSite!") are shown in graphical interface 1000. The action links may have been rendered within an iframe 1030. The border of iframe 1030 may not normally be visible in the visible version of graphical interface 1000. The user's selection of button 1010 may cause browser 510 to request the associated service. For instance, browser 510 may contact the GMAIL service and receive an e-mail interface through which the user may compose an e-mail in which a link to the "Aircraft Galaga" article is automatically included (or into which content from the "Aircraft Galaga" article is automatically posted). Similarly, the user's selection of button 1020 may cause browser 510 to contact the mySocialSite service and receive an interface through which the user may in some way share the "Aircraft Galaga" article through the service.

FIG. 10B is a diagram illustrating exemplary action links in a graphical interface 1040. Here, assume that the action links are rendered as a single "share" button 1050 using, for example, a browser scripting language. Moving the mouse over button 1050 may cause a window 1060 to appear, via which the user may select an action link.

It can be appreciated that the possible action links that may be provided by action link provider 530 may not be fixed. For instance, action link provider 530 may allow the services corresponding to the action links to register their services with action link provider 530.

Action link provider 530, as discussed above, may provide dynamically generated action link content to clients. The generated action link content may be generated based on both end-user preferences and/or preferences of the content provider. This may be advantageous to the user, as the user may receive action links in which they have expressed an interest and, therefore, may be more relevant to the user. It may also be advantageous to the content provider, as because the action links may be particularly relevant to the user, the user may be more likely to use the action links to help disseminate the content.

A number of alternatives or additions to the above discussion of providing action links by action link provider 530 are possible. For example, action registry component 830 may store data structures more or less structured than HTML templates. In general, any structure that contains enough information to make the transformation from a content URL and action label to a fragment of HTML may suffice. For example, a relatively small dictionary containing values for "icon_url," "destination_url_template," and "link text" may be enough.

Additionally, in some implementations, the default action list for a content item may be specified in ways other than by including the default action list as parameters in action frame 519. In one such alternative, action link provider 530 may allow content providers 525 to configure defaults for the content provider. This information may be stored in action registry 830 and may be returned when a user's preference is unknown or in addition to the user preference information.

CONCLUSION

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 4 and 7, the order of the blocks may be modified in other implementations. Further, non-dependent blocks may be performed in parallel.

Also, certain portions of the implementations have been described as "logic" or a "component" that performs one or more functions. The terms "logic" or "component" may include hardware, such as a processor, an ASIC, or a FPGA, or a combination of hardware and software (e.g., software running on a general purpose processor that transforms the general purpose processor to a special-purpose processor that functions according to the exemplary processes described above).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:

receiving, by one or more server devices, from a client device, and without further interaction by a user of the client device, a request for one or more action links that are to be inserted into a document previously requested and received by the client device;

identifying, by the one or more server devices, the one or more action links based on information that identifies one or more action services previously defined by the user and that is previously stored by the one or more server devices, the one or more action services including at least one of one or more email services or one or more social networking services, and each of the one or more action links providing an opportunity for the user associated with the client device to share the document by using one of the one or more action services;

generating, by the one or more server devices, content that includes the one or more action links; and providing, by the one or more server devices and to the client device, the content for presentation within the document.

2. The method of claim 1, where identifying the one or more action links is further based on parameters specified by a content provider that provides the document to the client device.

3. The method of claim 2, where the request for the one or more action links includes the parameters specified by the content provider.

4. The method of claim 1, where the information, that identifies the one or more action services previously defined by the user, specifies the one or more action links for one or more specific content types of the document.

5. The method of claim 1, where the content includes hyper-text markup language (HTML) content that includes, for each of the one or more action links, a link to one of the one or more action services.

6. The method of claim 1, where the content includes code for a scripting language used to present the content at the client device.

7. The method of claim 6, where the code for the scripting language, upon execution, identifies or describes at least one of the one or more action links.

8. The method of claim 1, further comprising:

parsing the request to extract one or more parameters relating to the request, the one or more parameters including information that defines one or more of:

a type of content of the document, a content provider associated with the document, default action link categories corresponding to the document, or one or more particular action links that should always be presented with the document, where identifying the one or more action links includes:

identifying the one or more action links based on the one or more parameters and the information that identifies the one or more action services previously defined by the user.

9. The method of claim 1, where identifying the one or more action links includes:

identifying the one or more action links, based on the information that identifies one or more action services previously defined by the user associated with the client device, when the user is logged into a system associated with the one or more server devices.

10. The method of claim 1, further comprising:

receiving a cookie with the request; and using the cookie to identify the user associated with the client device.

11. A non-transitory computer-readable medium storing instructions, the instructions comprising:

one or more instructions that, when executed by one or more devices, cause the one or more devices to:

receive, without further interaction by a user of a client, a request for action links that are to be displayed within a document previously requested and received by the client, determine the action links based on information that identifies one or more action services previously defined by the user and that is previously stored in or by the one or more devices, the one or more action services including at least one of one or more email services or one or more social networking services, and the action links providing an opportunity for the user associated with the client to share the document by using one of the one or more action services;

generate content that describes the action links; and provide the content to the client for presentation of the document with the content that describes the action links.

12. The non-transitory medium of claim 11, where the information, that identifies the one or more action services previously defined by the user, specifies the action links for specific content types of the document.

13. The non-transitory medium of claim 11, where the content includes hyper-text markup language (HTML) content that includes, for each of the determined action links, a link to a service corresponding to one of the action links.

14. A system comprising:

one or more processors to:

receive, from a client device and without further interaction by a user of the client device, a request for one or more action links that are to be inserted into a document previously requested and received by the client device;

determine, based on information that identifies one or more action services previously defined by the user and that is previously stored for use by the one or more processors, the one or more action links for the document, the one or more action services including at least one of one or more email services or one or more social networking services, and each of the one or more action links providing an opportunity for the user associated with the client to share the document by using one of the one or more action services; and transmit, as a response to the request and to the client device, content that represents the one or more action links.

15. The system of claim 14, where, when determining the one or more actions links, the one or more processors are to:

determine the one or more action links based on information that identifies the one or more action services and based on parameters specified by a content provider that provides the document to the client device.

16. The system of claim 15, where the request includes the parameters specified by the content provider.

17. The system of claim 16, where the information that identifies the one or more action services specifies the one or more action links for specific content types of the document.

18. The system of claim 15, where the one or more processors are further to:

parse the request to extract one or more parameters relating to the request, the one or more parameters including information that defines one or more of:

a type of content of the document, a content provider associated with the document, or default action link categories corresponding to the document, and where, when determining the one or more actions links, the one or more processors are to:

determine the one or more action links based on the information that identifies the one or more action services and based on the one or more parameters.

19. A method comprising:

receiving, by one or more server devices and without further interaction by a user of a client device, a request for one or more action links that are to be inserted into a document previously requested and received by the client device;

identifying, by the one or more server devices, the one or more action links based on information that identifies one or more action services previously defined by the user and that is previously stored for use by the one or more server devices, the one or more action services including at least one of one or more email services or one or more social networking services, and each of the one or more action links providing an opportunity for the user associated with the client device to share the document;

identifying, by the one or more server devices, a script that includes code to present at least some of the one or more action links; and providing, by the one or more server devices and to the client device, the script for execution by the client device to present the one or more action links.

20. The method of claim 19, where the script includes additional code to:

determine additional action links based on preferences of the user; and present the additional action links with the one or more action links.

21. A system comprising:

one or more devices, implemented in hardware, to:

receive, from a client device and without further interaction by a user of the client device, a request for content that describes one or more action links that are to be displayed in association with a content item previously requested and received by the client device;

identify, based on information that identifies one or more action services previously defined by the user and that is previously stored for use by the one or more devices, the one or more action links, the one or more action services including at least one of one or more email services or one or more social networking services, and each of the one or more action links providing an opportunity for the user associated with the client device to share the content item by using one of the one or more action services;

generate the content that describes the one or more action links after identifying the one or more action links; and provide, to the client device, the content for presentation of the content item with the content.

22. The system of claim 21, where the request includes one or more parameters that define at least one of:

a type of content of the content item, a content provider associated with the content item, or action link categories corresponding to the content item, and where, when identifying the one or more action links, the one or more devices are to:

identify the one or more action links based on the one or more parameters and the information that identifies the one or more action services.

23. The system of claim 21, where the request includes an identifier associated with the user, and where the one or more devices are further to:

retrieve the information that identifies the one or more action services based on the identifier associated with the user.

* * * * *